(No Model.) 2 Sheets—Sheet 2.
E. G. LATTA.
VELOCIPEDE.
No. 379,017. Patented Mar. 6, 1888.
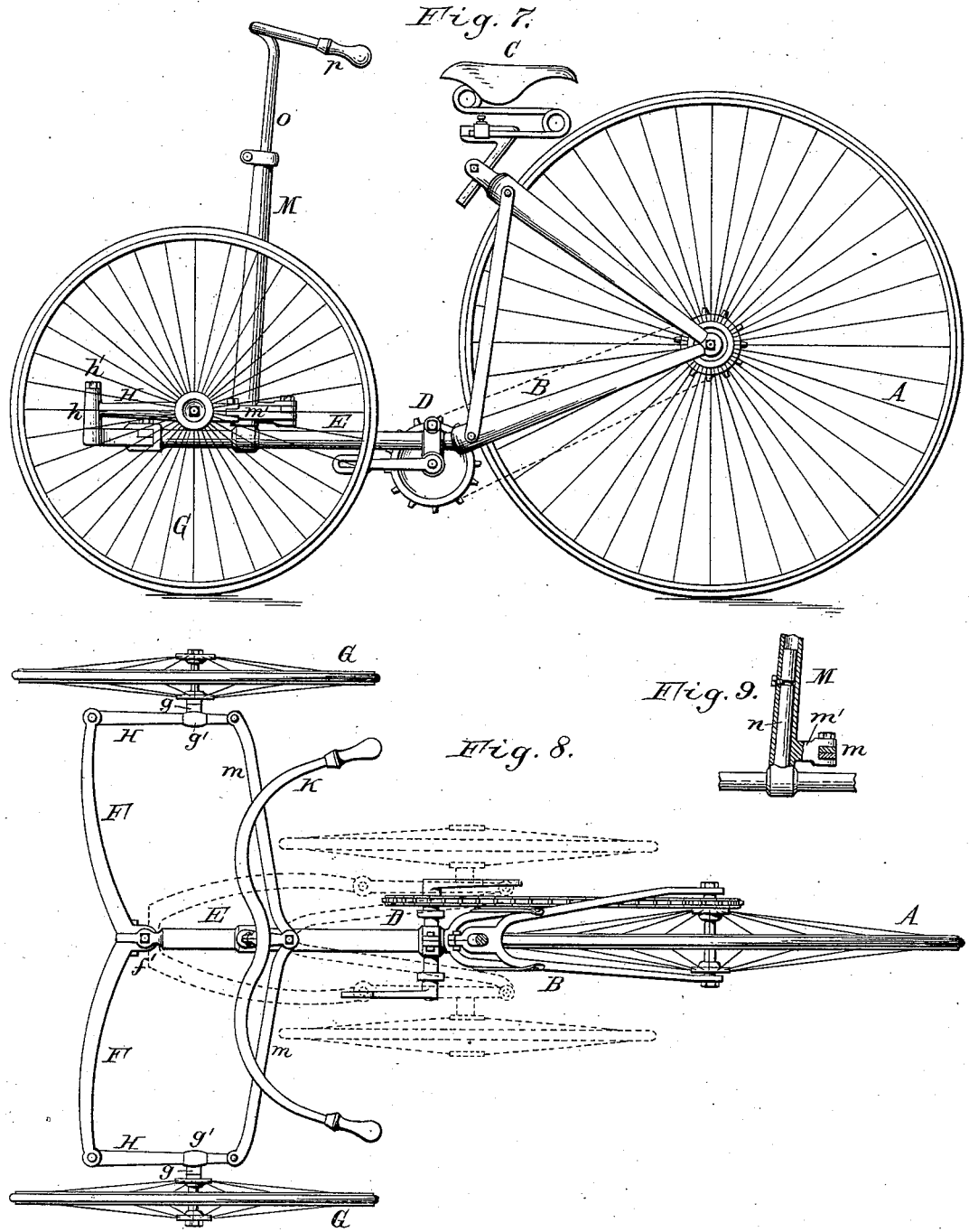
Witnesses:
Theo. L. Popp
Geo. J. Buchheit Jr.
E. G. Latta Inventor.
By Wilhelm Bonner.
Attorneys.

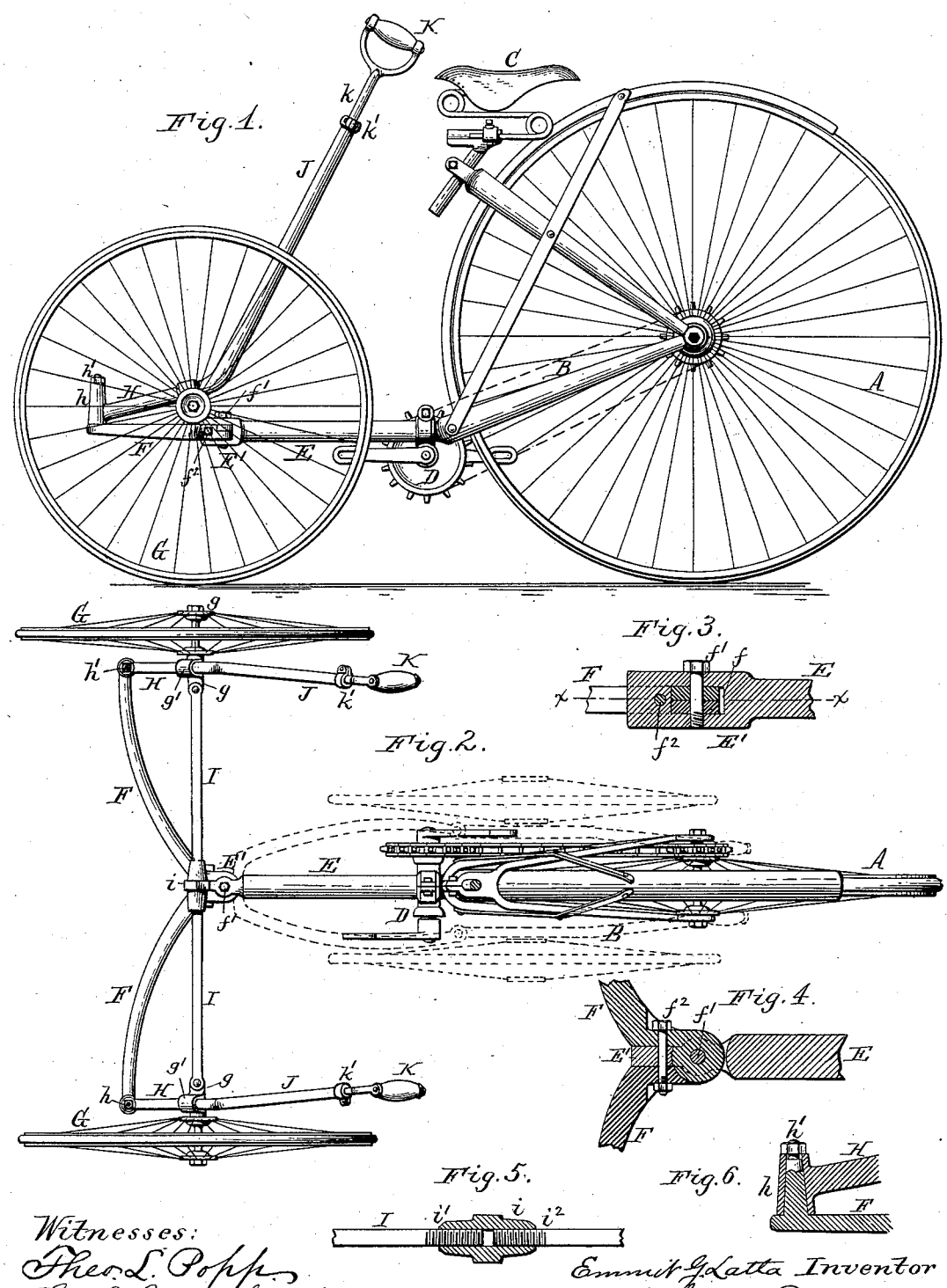

United States Patent Office.

EMMIT G. LATTA, OF FRIENDSHIP, NEW YORK, ASSIGNOR TO THE POPE MANUFACTURING COMPANY, OF PORTLAND, MAINE.

VELOCIPEDE.

SPECIFICATION forming part of Letters Patent No. 379,017, dated March 6, 1888.

Application filed September 24, 1887. Serial No. 250,626. (No model.)

*To all whom it may concern:*

Be it known that I, EMMIT G. LATTA, of Friendship, in the county of Allegany and State of New York, have invented new and useful Improvements in Velocipedes, of which the following is a specification.

The object of this invention is to produce a light and inexpensive tricycle having a single rear driving-wheel and two front steering-wheels, and which can be folded compactly together when not in use.

The invention consists of the improvements, which will be hereinafter fully described, and pointed out in the claims.

In the accompanying drawings, consisting of two sheets, Figure 1 is a side elevation of my improved tricycle. Fig. 2 is a top plan view thereof with the saddle removed. Fig. 3 is a vertical section of the head at the front end of the reach. Fig. 4 is a horizontal section thereof in line $x\ x$, Fig. 3. Fig. 5 is a sectional elevation of the central portion of the cross-bar which connects the axles of the steering-wheels. Fig. 6 is a sectional elevation of one of the joints of the steering-wheel supports. Fig. 7 is a side elevation of a modified construction of my improved tricycle. Fig. 8 is a top plan view thereof with the saddle removed. Fig. 9 is a sectional elevation of the lower portion of the steering-post.

Like letters of reference refer to like parts in the several figures.

A represents the rear driving-wheel; B, the main or wheel frame in which the same is mounted; C, the saddle, and D the crank mechanism. The rear wheel and its driving-gear, the wheel-frame, and the saddle-support may be of the usual or any other suitable construction.

E represents the reach, which extends forwardly from the lower end of the rear wheel-frame, B, and which is provided at its front end with a head, E', secured to the reach by brazing or otherwise.

F represents forwardly and outwardly curved arms, which are pivoted with their inner ends in a horizontal opening, $f$, in the head E' by a vertical bolt, $f'$, passing through the head E' and the overlapping inner ends of the arms F, as clearly shown in Figs. 3 and 4.

$f^2$ is a horizontal clamping-bolt passing through the arms F and head E' in front of the pivot-bolt $f'$, whereby the arms F are rigidly held against opposite sides of the head E'.

G represents the front steering-wheels, mounted upon short independent axles $g$, which are secured to arms H, pivoted to the outer ends of the arms F and extending rearwardly therefrom. The axles $g$ are provided on their upper sides with sleeves $g'$, through which the arms H pass. The latter are provided at their front ends with sockets $h$, which engage over upright studs or pivots $h'$, formed at the outer ends of the arms F, as shown in Fig. 6.

I represents a transverse rod or brace, which connects the axles $g$ of the steering-wheels and whereby the latter are held parallel with each other and caused to move simultaneously. The brace I consists of two sections, which are pivoted with their outer ends to the inner ends of the axles $g$ and connected at their inner ends by a screw sleeve or nut, $i$. The inner ends of the brace-sections are provided, respectively, with right and left hand screw-threads, $i'\ i^2$, which engage in screw-threaded openings in the nut $i$, as shown in Fig. 5.

J J represent the steering-levers, which are secured to or formed in one piece with the arms H, and which extend upwardly and backwardly therefrom and terminate near the saddle C, on opposite sides thereof. K represents the handles of the steering-levers, and $k$ the shanks thereof, which are adjustably secured in the upper ends of the steering-levers by suitable clamps, $k'$. Upon moving either steering-lever J laterally the arms H are caused to swing on their pivots $h$, whereby both steering-wheels are turned simultaneously. As the pivots of the steering-levers J are located in front of the axles of the steering-wheels, the tendency of the wheels to swerve when striking an obstruction is greatly lessened. This construction of the steering mechanism also tends to throw the steering-wheels toward the outside in turning at speed, and prevents to a great extent the machine from overturning by centrifugal force. The cross-rod I serves as a brace which causes one steering-wheel to brace the other in passing over stones or other obstructions, thereby relieving the rider's arms from side strains.

When it is desired to fold up the machine, the horizontal bolt $f^2$ is removed from the arms F, and the inner ends of the sections of the braces I are disconnected by removing the screw-sleeve $i$. The arms F, with the steering-levers J and steering-wheels G, are then folded back into the position shown by dotted lines in Fig. 2, the arms F swinging rearwardly and inwardly upon the vertical bolt $f'$ as a pivot. In this manner both the length and width of the machine are reduced, which enables the machine to be stored in a small space and to pass through narrow doors or passages.

My improved construction of the steering-wheels and their folding frame is equally desirable for tricycles which have ordinary bicycle-handle bars and a steering-post. Such a machine provided with my improved folding frame is represented in Figs. 7 and 8. In this construction the rear ends of the axle-supporting arms H, are connected with the upright tubular steering-post M by cross-rods $m$, which are pivoted with their outer ends to the rear ends of the arms H and with their inner ends to an arm, $m'$, projecting rearwardly from the lower end of the steering-post, as represented in Figs. 7 and 9. The steering-post M turns with its lower end upon a vertical pivot, $n$, secured to the reach. O is the handle-bar post, which is adjustably secured in the upper end of the steering-post, and $p$ are the handle-bars secured to the post O. In this construction the arms F fold backwardly and inwardly, as in the construction represented in Figs. 1 and 2, but without disconnecting the cross-rods $m$, which latter are permitted to fold back by the joint connecting them to the arm $m'$. If desired, the handle-bars may be given a quarter-turn or be entirely removed for close storage.

I claim as my invention—

1. In a tricycle, the combination, with the rear driving-wheel and the main frame, of two front steering-wheels, and a jointed frame which supports the steering-wheels and is adapted to fold backwardly and inwardly, substantially as set forth.

2. The combination, with the rear driving-wheel and the main frame, of two front steering-wheels, lateral arms pivoted with their inner ends to the main frame, wheel-supporting arms pivoted to the outer ends of the lateral arms, and a transverse brace connecting the wheel-supporting arms, substantially as set forth.

3. The combination, with the rear driving-wheel and the main frame provided at the front with laterally-extending arms, of independent steering-wheel supports pivoted to said arms and extending rearwardly therefrom, and two front steering-wheels attached to said supports in rear of the pivots thereof, substantially as set forth.

4. The combination, with the rear driving-wheel and the main frame provided with a reach, E, of the lateral arms F, pivoted to the reach, arms H, pivoted to the outer ends of the arms F and extending rearwardly therefrom, steering-wheels G, supported by the arms H, and a jointed cross-brace, I, connecting the arms H, substantially as set forth.

5. The combination, with a rear driving-wheel, its frame, and the reach, of arms F, pivoted at their inner ends to the reach by a vertical bolt, $f'$, a clamping-bolt, $f^2$, connecting the arms F in front of the bolt $f'$, steering-wheels G, independent wheel-supports H, pivoted to the arms F, and a jointed brace, I, connecting the supports of the steering-wheels, substantially as set forth.

6. The combination, with the rear driving-wheel and the frame provided with a reach, E, of the arms F, pivoted to the reach, the arms H, pivoted to the arms F, steering-wheels G, mounted on the arms H, and a connecting-brace, I, composed of screw-threaded sections and a screw-sleeve, substantially as set forth.

7. The combination, with the rear driving-wheel and the main frame provided at the front with laterally-extending arms, of independent steering-wheel supports pivoted to said arms and extending rearwardly therefrom, two front steering-wheels attached to said supports in rear of the pivots thereof, and a transverse brace connecting said steering-wheel supports, substantially as set forth.

8. The combination, with the rear driving-wheel and its frame, of two front steering-wheels, independent pivoted supports to which the steering-wheels are attached, and an independent steering-lever attached to each steering-wheel support, substantially as set forth.

9. The combination, with the rear driving-wheel and the main frame, of two independent pivoted arms, H, steering-wheels attached to the arms H, and independent steering-levers J K, secured to the arms H, substantially as set forth.

Witness my hand this 24th day of August, 1887.

EMMIT G. LATTA.

Witnesses:
S. G. LATTA,
M. W. POTTER.